United States Patent [19]

Cannon

[11] Patent Number: 4,615,543
[45] Date of Patent: Oct. 7, 1986

[54] LATCH-TYPE TUBING PROTECTOR

[76] Inventor: James H. Cannon, 1903 Adams St., Missouri City, Tex. 77489

[21] Appl. No.: 660,801

[22] Filed: Oct. 15, 1984

[51] Int. Cl.$^4$ .................................................. F16L 55/00
[52] U.S. Cl. ....................................... 285/12; 285/45; 285/419; 175/325
[58] Field of Search .................. 285/45, 373, 419, 421; 166/241; 175/325; 174/47, 136; 308/4 A; 138/110

[56] References Cited

U.S. PATENT DOCUMENTS

| | | | |
|---|---|---|---|
| 544,943 | 8/1895 | Woodside | 285/419 |
| 3,740,801 | 6/1973 | Sears, Jr. et al. | 285/373 |
| 4,266,578 | 5/1981 | Swain et al. | 166/241 |
| 4,422,504 | 12/1983 | Moore | 174/47 |
| 4,484,785 | 11/1984 | Jackson | 166/241 |
| 4,543,998 | 10/1985 | Thomerson | 166/241 |

FOREIGN PATENT DOCUMENTS

| | | | |
|---|---|---|---|
| 980683 | 1/1965 | United Kingdom | 285/421 |
| 2121091 | 12/1983 | United Kingdom | 166/242 |

*Primary Examiner*—Cornelius J. Husar
*Assistant Examiner*—Anthony Knight
*Attorney, Agent, or Firm*—Robert M. Carwell

[57] ABSTRACT

Apparatus for protecting tool joints and injection or control tubing of production tubing strings employed in the production of oil and gas. A pair of half-cylinder shaped sections are provided which are interconnected at respective edges by an elongate piano-type hinge having a releasable pin. The opposite edges are provided with a plurality of pin guide sections matingly received by each other to define a pair of longitudinal pin slots when the protector is disposed about a tool joint. A pair of mating tapered pins are provided for each slot whereby when the pins are driven into their respective slots, the edges of the half-sections carrying the pin guides are drawn toward each other to effect progressively tighter engagement of the protector about the tool joint and tubing in an interference fit. Half-sections of varying radii of curvature and pins of varying taper are provided, whereby a variety of tool joints having differing outer dimensions may be accommodated, resulting in an effective interference fit by substituting half-sections and pins of appropriate size. A window intermediate the pair of pin slots facilitates lower pin installation while providing for slight flexing of the protector about the tool joint to further accommodate dimensional variations thereof.

11 Claims, 14 Drawing Figures

LATCH-TYPE TUBING PROTECTOR

BACKGROUND OF THE INVENTION

1. Field of Invention. This invention relates to protectors for use in protecting tubular goods employed in the petroleum industry, and, more particularly, to latch-type protectors utilized to protect encapsulated or bare tubing and tool joints of production tubing strings.

2. Background of the Invention. In the petroleum industry, production tubing is disposed within a borehole for transporting oil and gas from subsurface bearing formations to the surface. This tubing is comprised of elongate sections threaded together to form a production string, the joint thereby formed being referred to variously as a tool joint, coupling, or upset.

In conjunction with this production tubing, it is frequently necessary to provide a system for delivering fluid media downhole. One reason may be to permit the injection of chemical treatment fluids near the producing formation for enhancing the production, for treatment of downhole conditions such as those involving undesirable corrosion, salt, or scale, and for delivery of corrosion or scale inhibitors, de-emulsifiers, or the like, downhole.

Yet another reason for providing these fluid delivery systems is for the transmission of fluid pressure to various downhole valves or tools from the surface for purposes of control or the like. Thus, various forms of injection or control lines referred to hereinafter generally as tubing and having internal diameters much smaller than that of the production tubing itself are provided which are disposed radially outward of and adjacent to the production tubing. In some cases the tubing is of an encapsulated variety wherein both the tubing and wire rope (which provides crush resistance from side forces) are encapsulated in an appropriate thermoplastic elastomer, whereas in other applications, the tubing may be of an unencapsulated or bare variety.

In other situations, electrical cables are routed downhole in like manner to the tubing for monitoring pressure instruments or for providing power for downhole motors or the like.

One problem with these tool joints and the associated tubing or cables (referred to hereinafter as tubing for convenience) is that they are frequently subjected to damage from contact with surrounding casing or the formation itself, such as when the production string is moved up or down within the borehole. This damage may be due to abrasion or compressive forces against the joint or tubing which often occurs as the tool joint is moved across a deviation in the borehole. Thus, means were sought for protecting this bare or unencapsulated tubing, cable and the tool joints from damage.

With reference to the accompanying drawings in general, in its most common form this protection took the form of a hollow cylindrically-shaped metallic cover known generally as a tubing protector comprised of half-sections which were disposed circumferentially about the tool joint and the injection or control tubing. These half-sections were hinged longitudinally along diametrically opposed edges by means of two piano-type hinges with mating straight hinge pins. A representative such protector may be seen depicted generally at page 4612 of the 1982-83 Composite Catalog of Oilfield Equipment and Services, published by World Oil.

A plurality of radially inwardly-extending lugs were disposed on the inner surface of the protector at opposed ends which were sized whereby they could form an interference fit contacting the outer surface of the production tubing or sloping portions of the tool joint itself.

These interference fits were intended to prevent relative rotational and longitudinal movement between the protector on the one hand and the production and injection or control tubing. Both such motions were frequently the cause of serious damage to the tool joint and tubing, such as the crimping or crushing of the injection tubing, abrasion of the tool joints, etc.

Although such tubing protectors of various designs afforded some degree of protection, several problems became associated with these protectors. First, the outer diameters of couplings of the commercially available production tubing such as the diameter of the portion of some joints known as the "upset" vary as a function of the specified weight of the production tubing for a given nominal production tubing o.d., the larger sizes of production tubing having greater variations. For example, production tubing having a four inch outer diameter may have tool joints which vary in outer diameter by as much as one inch. However, such widely-ranging variances in outer diameters made the aforementioned critical interference fits difficult to achieve.

One approach to this problem was to fabricate half-sections of protectors of varying sizes. In this manner, half-sections may be paired in relation to the given outer diameter of the given tool joint so as to provide a custom fit. However, such an approach was found to be commerically impractical for several reasons. First, numerous dies of varying radii of curvature had to be maintained for each weight of tubing to provide the desired nominal inner diameters of the tubing protector half-sections to cover the widely varying ranges of outer diameters of the tool joints.

Due to the hinging on both sides of the protector, variation in internal diameters thereof to accommodate different tool joints was provided primarily from the different sizes of protector half-sections which were staked. This approach was found to be prohibitively expensive, resulting in high production costs, large inventory levels, and large amounts of capital tied up in stock in order to accommodate the varying sizes.

Moreover, even for a given specified nominal size of production tubing, manufacturing tolerances, wear on the joints during use, or the like still resulted in oversizing or undersizing of tool joint outer diameters by as much as 0.020-0.030 inches from the specified value. Also the outer diameter of the tubing itself in accordance with conventional industry standard could often typically vary by as much as ±0.031 inches or ±0.75% for tubing up to 4 inches in diameter or for tubing of 4 inches or more in diameter, respectively. This factor made it not only desirable but often essential to be able to custom fit such protectors at the wellsite to achieve the necessary close interference fit.

Moreover, the outer diameter of the radially outward sloping portion of tool joints also varied with a given weight of production tubing. Thus for a given such weight, it was not uncommon to see in the field substantial variances in length of these portions of the tool joints. This in turn made it difficult to provide for reliable interference fits between these portions and the aforementioned lugs, which is why it was typical in the industry to provide for as much as 0.060-0.080 design clearance between the aforementioned lugs and the production tubing.

This, in turn, meant that it was anticipated that the tubing protector would slide longitudinally along the production tubing until such an interference fit contact between the lugs and the tool joint was effected. Whereas a slight amount of longitudinal displacement of the tubing protector relative to the production tubing was permissible without causing undue wear on the tool joint or tubing, such clearance would at times permit relative rotational movement between the tool joint and the protector. As previously discussed, this frequently resulted in damage to the injection or control tubing and undue wear on the tool joint.

Yet another serious problem encountered in prior tubing protectors was associated with the provision of diametrically opposed piano-type hinges as previously described. In order to effect the necessary tight interference fit, the pins were subjected to inordinately high strains. This was particularly due to the aforementioned impracticability of providing custom fits by means of appropriately sized half-sections alone. Thus installers of the protectors would attempt to make do with the size protector they had on hand, often employing installation or compression tools for compressing the ill-fitting protector sections about the production tubing. This, in turn, frequently resulted in permanent deformation of protector half-sections and hinge pins, thus rendering their removal difficult and their re-installation ill-advised at best and oftentimes impossible.

In summary, tubing protectors were required to fit wide ranges of tubing o.d.s from ¾ inch to 4½ inches for example. Even for a specified o.d., it might vary by the aforementioned 0.031 inches or 0.75% or more depending upon where, manufacturer tolerance, and the like. Moreover, for a given tubing o.d., the associated commercially available specified tool joint nominal o.d. also could vary by as much as one inch or more.

Still further, as previously noted, this joint o.d. itself could vary typically by 0.020–0.030 inches due to tolerances, wear, and the like. All of these variations required manufacturers to provide at times as many as 30 different sizes or radius of curvature half-sections of protectors.

Accordingly, due to all of these ranges and dimensional variances, a latch-type production tubing protector was desired which was easy and inexpensive to manufacture, install, and remove, and avoided the need for large numbers of dies, inventories of different parts and the like, and yet reliably accommodated a wide variation of tubing and tool joint sizes.

SUMMARY OF THE INVENTION

In a preferred embodiment of the invention, apparatus is provided for protecting tool joints and injection or control tubing of production tubing strings employed in the production of oil and gas. A pair of half-cylinder shaped sections are provided which are interconnected at respective edges by an elongate piano-type hinge having a releasable pin. The opposite edges are provided with a plurality of pin guide sections matingly received by each other to define a pair of longitudinal pin slots when the protector is disposed about a tool joint. A pair of mating tapered pins are provided for each slot whereby when the pins are driven into their respective slots, the edges of the half-sections carrying the pin guides are drawn toward each other to effect progressively tighter engagement of the protector about the tool joint and tubing in an interference fit. Half-sections of varying radii of curvature and pins of varying taper are provided, whereby a variety of tool joints having differing outer dimensions may be accommodated, resulting in an effective interference fit by substituting half-sections and pins of appropriate size. A window intermediate the pair of pin slots facilitates lower pin installation while providing for slight flexing of the protector about the tool joint to further accommodate dimensional variations thereof.

DETAILED DESCRIPTION

Figure 1:
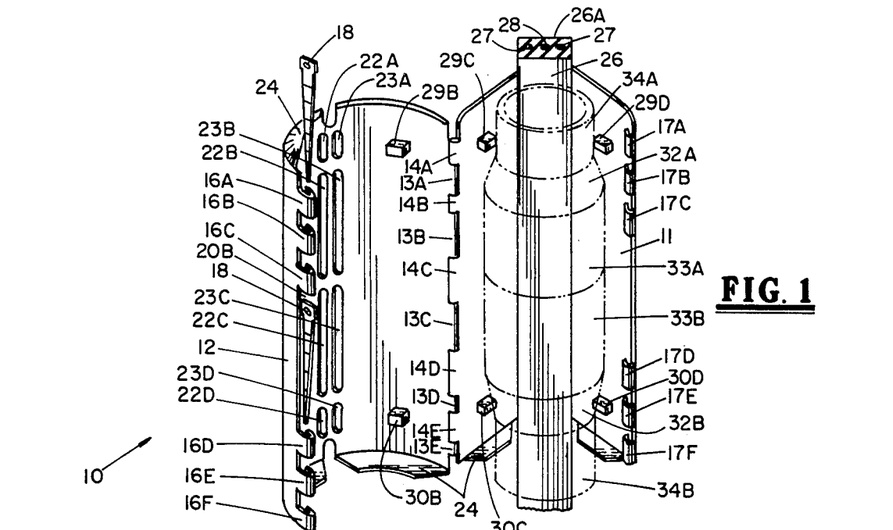
FIG. 1 is a pictorial view depicting one embodiment of a latch-type tubing protector of the present invention.

Referring to FIG. 1, there will be seen depicted therein generally a tubing protector 10 of the present invention for protecting tool joints of production tubing strings or the like. Whereas the description which follows is directed to the protection of such production tubing joints, it will be appreciated that the protector of the present invention is equally adaptable to protection of similar joints for other types of tubular goods, and accordingly, the invention is not intended to be so limited to production tubing applications.

With reference to FIG. 1, the protector 10 will be seen to be comprised generally of right and left half-sections 11 and 12, respectively formed into generally half-cylindrical shapes hinged together in a manner to be hereinafter described. More particularly, each half-section 11 and 12 is provided with a plurality of respective hinge sections 14a–e and 13a–e, respectively, which may be matingly aligned to form a vertical slot 15a (FIG. 3) adapted to receive a hinge pin 15.

In like manner, each half-section 11 and 12 is further provided with respective pin guide sections 17a-f and 16a-f on the other edges of the half-sections 11 and 12. When these half-sections 11 and 12 are disposed about production tubing 34a and 34b, shoulders 32a and 32b, and production tubing sections 33a and 33b (shown in phantom in FIG. 1 and referred to collectively as a production string) the pin guide sections 16a-f and 17a-f will matingly engage so as to form pin slots 21 (depicted more clearly in FIG. 3). In this manner, when pins 18 are disposed through slots 21, also in a manner to be described, the protector 10 will be releasably engaged about the tool joint of the production tubing string.

Still referring to FIG. 1, it will be noted that the half-sections 11 and 12 will be formed so as to have respective window sections 20a and 20b providing a window when disposed about the tool joint with the pins 18 in place. A plurality of indents 22a-d and 23a-d are provided which extend radially inwards, the purpose of such indents and the window being to provide flexibility in order to enable the protector 10 to adapt to varying outer diameters of tool joints in a manner to be described. Each half-section 11 and 12 will further be provided with shoulders 24 for purposes of preventing the protector 10 from sliding past the tool joint due to friction between the protector 10 and surrounding casing or the like.

Figure 3:
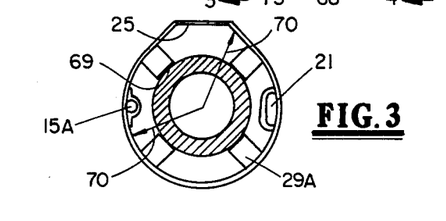
FIG. 3 is a plan view in cross-section of the protector of FIG. 1 taken along line 3—3.

Referring now to FIG. 3, it will be noted that one of the half-sections, in this case section 11, may be provided with a flat recess 25, the purpose of which is to receive an encapsulated tubing bundle 26, the latter serving to deliver fluid media downhole for the aforementioned purposes of hydraulic control, chemical treatment or the like. Referring back to FIG. 1, the encapsulated bundle 26 in one embodiment may take the form of wire rope 27 and injection tubing 28 encapsulated in an epoxy thermoplastic 26a and extending substantially the length of the production string and parallel thereto within recess 25. The purpose of the wire rope 27 is to provide vertical support for the tubing 28 and crush resistance as set forth hereinbefore in a manner known in the art. The tubing 28 may also be provided in a variety of other forms such as that to be hereinafter discussed with reference to FIGS. 5 and 6.

Figure 2:
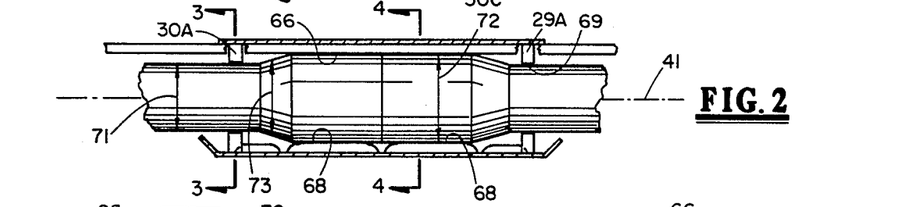
FIG. 2 is a pictorial elevational view, partially in section, depicting the tubing protector illustrated in FIG. 1.

Still referring to FIG. 1 and with reference also to FIGS. 2 and 3, it will be noted that a plurality of metallic lugs 29a-d and 30a-d may be provided disposed within protector 10 at either end thereof preferably at 90° angles to one another. (Lug 30a will be placed similarly to lug 29a of FIG. 3 at the other end of the protector.) A typical portion of a production string with which the protector 10 of the present invention is employed is comprised of elongate production tubing sections 34a and 34b, each of which having adjacent ends threadedly mating to form a tool joint. The tool joint, in turn, is comprised of radially outward sloping shoulders 32a and 32b having an increasing outer diameter 73, cylindrical sections 33a and 33b having an outer diameter 72, and production tubing sections having an outer diameter 71.

With reference to FIG. 3, which is a crosssection of FIG. 2 taken along line 3—3, it will be seen that lugs 29a-d are disposed about section 34a in quadrature with a preferred design clearance 69 between the lugs 29a-d and the expected nominal diameter 71 of the outer surface of section 34a of 0.060-0.080 inches. In like manner, the lugs 30a-d may be disposed about section 34b in quadrature with a clearance 69 between the lugs and the outer surface of section 34b. Referring to FIG. 2, it will thus be appreciated that in some cases when the sections 34a-b have sufficient outer diameters, these lugs 29a-d and 30a-d may contact the outer surfaces of the sections 34a and 34b to form an interference fit preventing substantial relative motion between the protector 10 and the tool joint along the longitudinal axis 41. However, in the case wherein these clearances 69 permit such relative movement, either the lugs 29a-d will eventually contact shoulder 32a to provide such interference fit, or lugs 30a-d will contact shoulder 32b to provide this interference fit.

Figure 4:
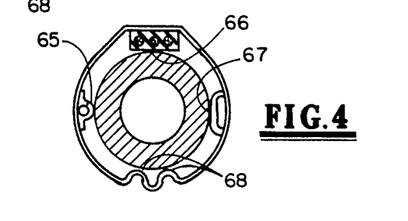
FIG. 4 is a plan view in cross-section of the protector of FIG. 1 taken along line 4—4.

Referring to FIG. 4, which is a cross-section of the production tubing and protector 10 depicted in FIG. 2 taken along lines 4—4, it will be noted that the relative radially inward portions of hinge sections 13a-e and 14a-e, indents 22a-d and 23a-d, pin guide sections 16a-f and 17a-f, and, encapsulated bundle 26 are selected so as to provide an interference fit along the outer surface of sections 33a and 33b. Thus, hinge sections 13a-e and 14a-e will contact the outer surface of sections 33a-b along interference contact locations 65 which are parallel to axis 41.

Similarly, encapsulated bundle 26 will have an interference contact location 66 with tubing sections 33a-b, pin guide sections 16a-f and 17a-f will have interference contact locations 67, and indents 22a-d and 23a-d will have interference contact locations 68 along the outer surface of sections 33a and 33b. These interference contacts 65-68 will be effected by driving tapered pins 18 to be hereinafter described in greater detail into their mating pin slots 21. It will be noted that the pins 18, as depicted in FIG. 1, are about to be driven into their respective slots formed by mating engagement of pin guide sections 16a-f and 17a-f as previously described.

Figure 5:
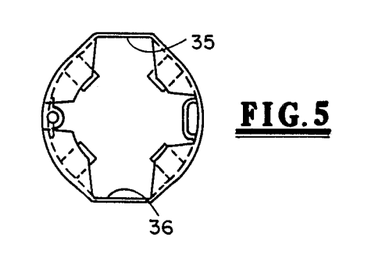
FIG. 5 is an end view of the protector of FIG. 1 depicting an alternate embodiment providing for a dual-encapsulated bundle of tubing.

Referring to FIG. 5, an alternate embodiment of the protector 10 of the present invention may be seen depicted therein. In some applications, it is desirable to provide for dual encapsulated bundles wherein an additional tubing line 28 is disposed downhole. In this case, two recesses 35 and 36 are provided preferably disposed in diametrically opposed relation, and each are adapted to receive a matingly encapsulated bundle 26 previously described. In this case, with reference to FIG. 4, each encapsulated bundle 26 disposed in a mating respective recess 35 and 36 will form its own interference fit along locations such as interference fit location 66 with the sections 33a-b of the production tubing.

Figure 6:
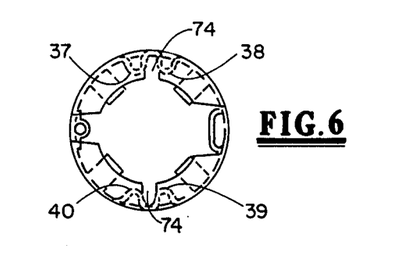
FIG. 6 is an end view of the protector of FIG. 1 depicting an alternate embodiment providing for unencapsulated tubing.

Referring now to FIG. 6, yet another embodiment of the present invention is depicted therein. In yet other cases, it is desirable to provide for tubing 28 which is bare or unencapsulated, and thus there is no need for the wire rope 27 or the thermoplastic epoxy covering material 26a. Thus, in FIG. 6, it will be noted that indents such as 22a-d and 23a-d shown in FIG. 1 may be provided in diametrically opposed relation on both half-sections 11 and 12, such indents in this embodiment being shown in FIG. 6 as indents 37, 38, 39, and 40. These, indents 37-40 thus provide a space 74 therebetween for disposing bare tubing.

It will be appreciated that FIGS. 5 and 6 are end views of alternate embodiments of the protector 10 after being installed about the production string as shown in FIG. 2. Moreover, with the exception of the arrangement of the recesses 35 and 36 (FIG. 5) and the indents 37-40 (FIG. 6), the protector is otherwise preferably identical to the hereinbefore described construction with reference to FIGS. 1–4. It will be noted that as in the case of FIG. 4 wherein interference location 6 is provided by indents 22a–d and 23a–d, similar interference contact locations 68 will be provided by the diametrically opposed indents 37–40 of FIG. 6. Also, in the embodiments of FIGS. 5 and 6, interference locations 65 and 67 will still be provided by hinge sections 13a–e, 14a–e and pin guide sections 16a–f, 17a–f, respectively. In the FIG. 5 embodiment, two interference fit locations 66 will be provided by the two encapsulated bundles 26.

Figure 7:
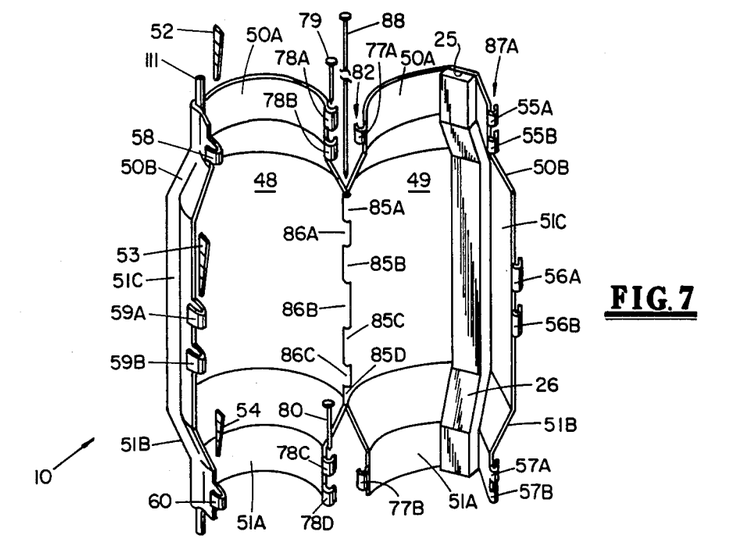
FIG. 7 is a pictorial view depicting an alternate embodiment of the tubing protector of the present invention.

Referring now to FIG. 7, yet another alternate embodiment of the protector 10 of the present invention may be seen depicted therein. A comparison of FIG. 7 with the embodiment depicted in FIG. 1 will reveal that in the FIG. 7 embodiment, first and second half-section members 48 and 49, which are substantially symmetrical, are provided. The first half-section member 48 includes a half-cylindrically shaped main body 51c which has an upper and lower shoulder 50b and 51b, respectively, each extending from a different end of the main body 51c and sloping radially inward toward the axis 41 and away from the main body 51c. The member 48 further includes an upper and lower collar 50a and 51a, respectively, each such collar having a half-cylindrical shape and extending from a different one of the shoulders 50b and 51b.

Still referring to FIG. 7, it will be noted that the main body 51c of first member 48 as well as the upper and lower collars 50a and 51a have a first edge which defines a plurality of first hinged sections. Sections 78a and 78b are disposed on upper collar 50a; sections 86a–c are disposed on main body 51c; and sections 78c–d are disposed on lower collar 51a of the first half-section member 48.

Similarly, the main body and upper and lower collars of first half-section member 48 have a second edge defining a plurality of first pin guide sections. More particularly, section 58 is disposed on upper collar 50a; sections 59a–b are disposed on main body 51c; and section 60 is disposed on lower collar 51a of member 48.

In like manner, the second half-section member 49 includes a second half-cylindrical main body 51c, and a second upper and lower shoulder 50b and 51b, respectively. Each such shoulder extends from a different end of the second main body 51c and slopes radially inward toward the axis 41 and away from the second main body 51c of member 49.

Figure 10:
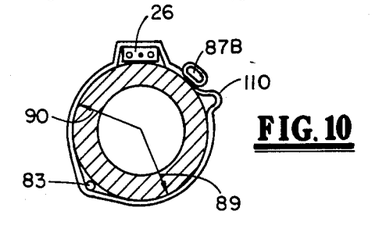
FIG. 10 is a plan view in cross-section of the protector of FIG. 3 taken along line 10—10.

It will be noted that unlike the first half-section member 48, the second such member 49 further includes a recess 25 extending in the direction of axis 41 for receiving the aforementioned encapsulated tubing 26 (shown in FIG. 10).

Still referring to the second half-section member 49, it will further be seen to include a second upper and lower collar 50a and 51a, respectively, each such collar having a half-cylindrical shape and extending from a different one of the shoulders 50b and 51b.

Also in like manner to the first main body, the second main body 51c of member 49, as well as the upper and lower collars 50a and 51a thereof include a first edge defining a plurality of second hinge sections. These hinge sections may be seen to be comprised of section 77a on the second upper collar 50a; and sections 85a–d on the second main body 51c; and section 77b on the lower collar 51a of the second member 49. In like manner, a second edge defining a plurality of second pin guide sections is provided by the second main body 51c and the second upper and lower collars 50a and 51a, respectively. More particularly, these second pin guide sections may be seen to be comprised of sections 55a–b on upper collar 50a; sections 56a–b on the second main body 51c; and seconds 57a–b on the lower collar 51a of the second member 49.

Figure 8:
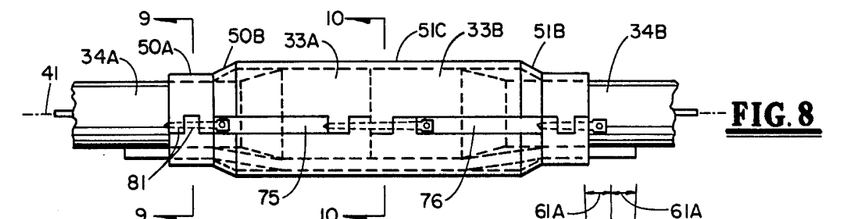
FIG. 8 is a pictorial elevational view of the protector depicted in FIG. 7.

From FIG. 8, it will be apparent that the aforementioned pluralities of first and second hinge sections are fashioned so as to be matingly engageable when aligned to define first, second, and third hinge pin slots 82–84, respectively, which will be parallel to the axis 41. The first hinge pin slot will be defined by the hinge pin sections on the first and second upper collars, whereas the third hinge pin slot 84 will be defined by the hinge pin sections on the first and second lower collars. Finally, the second hinge pin slot 83 will be seen to be defined by the hinge pin sections carried on the first and second main bodies 51c of the members 48 and 49.

Figure 9:
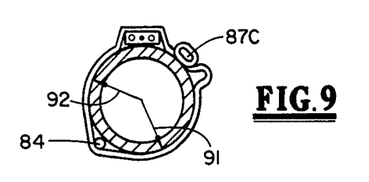
FIG. 9 is a plan view in cross-section of the protector of FIG. 7 taken along line 9—9.

Still referring to FIGS. 7–9, first, second, and third hinge pins will be provided to be disposed, respectively, in the aforementioned first, second, and third hinge pin slots 82–84. In this manner, the first and second half-section members 48 and 49 will thereby be in a hinged relationship whereby they will define cyindrical shapes when disposed about the coupling as depicted in FIG. 8.

In like manner to the hinge sections defining hinge pin slots, the pluralities of first and second pin guide sections will, in like manner, be fashioned so as to be in mating engageable alignment to define first, second and third tapered pin slots 87a–87c which are also parallel to axis 41.

The first and third tapered pin slots 87a and 87c are defined, respectively, by the pin guide sections on the first and second upper collars with respect to the first slot, and the pin guide sections on the first and second lower collars with respect to the third slot. Similarly, the second pin slot 87b will be defined by the pin guide sections on the first and second main bodies 51c of the members 48 and 49.

First, second, and third tapered pins 52–54 will further be provided which may be disposed in respective ones of the first, second, and third pin slots 87a–87c.

From the foregoing and with reference to FIGS. 9 and 10, it will now be apparent that the pluralities of first and second hinge sections, first and second pin guide sections, and the tubing, when disposed in the recess between the protector and the production string, will have radially inward portions extending along the direction of the axis which will effect an interference fit. More particularly, this interference fit will be effected with the outer surface of the production string when the tapered pins 52–54 are disposed, respectively, in their pin slots 87a–87c and when the hinge pins 79, 88, and 80 are disposed, respectively, in their hinge pin slots 82–84.

Reference to FIG. 8 will indicate that the second edges of members 48 and 49 will further be provided with portions which, when the aforementioned interference fit is established, will define a first window 76 between the first and second tapered pin slots 87a and 87b, and a second window 75 between the second and third tapered pin slots 87b and 87c.

In the embodiment of FIG. 7–FIG. 9, unlike that of FIG. 1, it will be appreciated that three interference fits may be desirably effected rather than one. More particularly, it will be appreciated that a first interference fit may be effected on the sections 33a and 33b of the production string. This interference fit will be achieved by the radially inward portions of the hinge sections on the first and second main bodies 51c of members 48 and 49, respectively; the first and second pin guide sections on these first and second main bodies, and the tubing itself. Such an interference fit may be seen by the cross-section depicted in FIG. 10 of the protector 10.

The upper and lower collars 50a and 51a will be seen to also effect their respective second and third interference fits. More particularly, the radially inward portions of the first and second hinge sections on the upper collar 51a, the pin guide sections on the upper collar, and the tubing provide this second interference fit with the production tubing section 34b.

In like manner, the radially inward portion of the first and second hinges on the lower collar 50a, the pin guide sections on this lower collar 50a, and the tubing will provide yet a third interference fit with the production tubing section 34a. Such an interference fit may be seen from the cross-section in FIG. 9 taken along line 9—9 of FIG. 8.

Still further, it will be understood that these first, second, and third interference fits will define corresponding first, second, and third circular cross-sectional areas lying in planes which are perpendicular to the axis 41. Such cross-sectional areas may be seen in the cross-sections of FIGS. 9 and 10. Moreover, these cross-sectional areas will be seen to decrease, respectively, with increased movement of the second, first, and third such tapered pins, 53, 52, and 54, into respective ones of the second, first, and third tapered pin slots 87b, 87a, and 87c. Thus, the magnitude of the first, second, and third interference fits may thereby be controlled by the degree to which the respective tapered pins 52-54 are driven into their respective tapered pin slots 87a-c.

With reference now to FIGS. 9 and 10, it will be noted that the main bodies 51c of the first and second members 48 and 49 will define a respective first and second radius of curvature 89 and 90. It is a feature of the present invention that at least one of these radii and the degree of taper (to be discussed hereinafter) of the second tapered pin 53 will desirably be preselected in functional relation to effect a desired preselected decrease in the cross-sectional area defined by the first interference fit.

With reference to FIG. 9, in like manner, it will be appreciated that the upper and lower collars 50a and 51a of the first and second members 48 and 49 will, in like manner, define a respective first and second radius of curvature 91 and 92. Similarly, it is a feature of the present invention that at least one of these radii of either the upper or lower collars and the taper of a respective first or third tapered pin 52 or 54 is preselected, again, in functional relation to effect a desired preselected decrease in the corresponding second or third cross-sectional areas giving rise to the aforementioned second and third interference fits.

Figure 11:
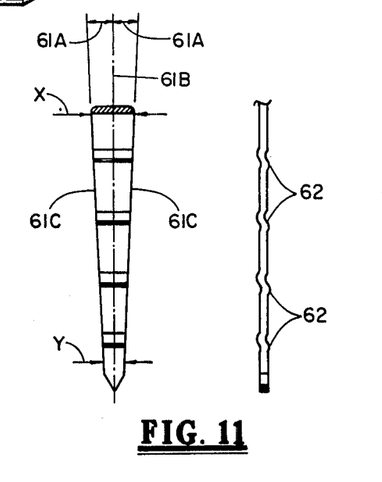
FIG. 11 is a pictorial view depicting a representative locking pin employed in the protectors of FIGS. 1 and 7.

Referring now to FIG. 11, a pin is seen depicted therein generally corresponding to the pins 18 of the embodiment of FIG. 1 and pins 52-54 of the embodiment of FIG. 7, such pins being hereinafter referred to for convenience as pin 18. More particularly, with reference to pin 18, a plurality of indents 62 or "keepers" will preferably be disposed on opposed outer surfaces of the pin 18 and spaced apart along its longitudinal axis 61b in lengths corresponding to the distances separating adjacent pin guide sections such as pin guides 16a and 17a of FIG. 1. The purpose of these keepers 62, which may be stamped into the key 18, is to provide outward protrusions which, when the key is installed, preferably will fit into the space between adjacent hinge sections so as to retain the key 18 in place. Such spaces may be seen identified in FIG. 8 as spaces 81, for example. Still referring to FIG. 11, each key will preferably have edges 61c which are tapered to form a taper angle 61a relative to the longitudinal axis 61b of the pin 18. The purpose of this tapering is to provide a gradually increasing force bringing the two half-sections of the protector 10 toward each other as the pins are driven into their respective guide slots so as to bring the protector 10 into tighter circumferential engagement about the tool joint to effect the desired interference fits.

With respect to such interference fits and the engagement of protector 10 about the tool joint, it will be recalled that one serious problem experienced in the prior art has been to provide for a universal tubing protector 10 which may be easily adaptable to tool joints having a wide variety of dimensional variation. In order to appreciate the great range of dimensions which must be accommodated in conventionally available tool joints, reference to the following example will be helpful. As but one illustration, for production tubing having a nominal outer diameter (71 of FIG. 2) of 3.5 inches, the outer diameter 72 of the tool joint or coupling itself may commonly be commercially available in sizes ranging, for example, from 3.795 to as much as 4.573 inches in diameter, with as many as 30 sizes or more being offered in between these extremes.

This, in turn, means that the circumference to be anticipated in the field of the sections 33a or 33b may vary from $3.795 \times \pi = 11.9223$ to $4.573 \times \pi = 14.3665$, resulting in a circumferential difference range of $14.3665 - 11.9223 = 2.4442$ inches. Thus, with reference to FIG. 11, in order for the protector 10 to accomodate such a wide circumferential variation of the coupling, the pin 18 width from its widest point X to its narrowest point Y would have to vary by this amount, or, in other words, the difference of X—Y would have to equal this circumferential difference.

Moreover, it will be appreciated that the nominal o.d. 71 of common commerically available production tubing may vary from $\frac{3}{4}''$ to $4\frac{1}{2}'''$, the commonly available sizes being $\frac{3}{4}''$, $1''$, $1\frac{1}{4}''$, $1\frac{1}{2}''$, $2''$, $21/16''$, $2\frac{3}{8}''$, $2\frac{7}{8}''$, $3\frac{1}{2}''$, $4''$, and $4\frac{1}{2}''$. Moreover, for each such nominal o.d. production tubing size, within a given size (as in the case of the example with 3.5" tubing) again the o.d. 72 of the coupling itself may be available in widely ranging sizes numbering as many as 30 or 40. Still further, even for a given specified o.d. 72 of the tool joint, manufacturing variations over the nominal published or specified o.d.s, as well as wear or the like commonly experienced in the field, result in over or undersized tool joints. This also results in large numbers of o.d.s which must be accommodated by a tool joint protector 10.

Returning now to the foregoing example with respect to 3.5" production tubing, due to the circumference variations which must be accommodated, it has been found that attempting to accommodate this difference of greater than 2" by one tapered pin 18 is not feasible inasmuch as for correct operation it is necessary to insure that the pin 18 engages the pin guides 16a-f, 17a-f, 55a-b, 56a-b, 57a-b, 58, 59a-b, and 60 correctly. More particularly, the pins, such as Pin 18, must not bottom out during installation. Moreover, if driven in too far into the pin slots 21, a proper interference fit may not be achieved and the pins may protrude too far, possibly hanging up while the production tubing is being installed or pulled from the downhole location.

Still referring to FIG. 11, for a nominal 6" length of pin 18, it has been found that a 1.5° taper angle 61a will result in a 0.052" change in width of the pin per inch or, in other words, a 0.052×6=0.312 change in width over the 6" length of the pin 18. A portion of this width change may thus be available to effect a portion of the required change in circumference to accommodate the aforementioned varying tool joint outside diameters 72. However, from the foregoing, it will be appreciated that one pin 18 of reasonable dimension may not thus be able to accommodate the entire circumferential variation of greater than 2". Accordingly, it has been found desirable to provide a plurality of pins having the same approximate taper but with starting nominal widths X varying in 0.1" increments from pin to pin.

Still further, with respect to some production tubing sizes, it has been found desirable to provide one of the half-sections 11 or 12 with differing internal diameters 70 (with reference to FIG. 3, diameters 89 or 90 (with reference to FIG. 10), and diameters 91 or 92 (with reference to FIG. 9). In this manner, partial variation in the internal diameter of the protector 10 for proper interference fit may be achieved by a selection of the appropriate radius of curvature of the half-sections 11 and 12 to achieve a desired nominal protector internal diameter for a given coupling outer diameter. Then, for "fine tuning", to achieve the precise desired internal diameters of the protector 10 to achieve the necessary interference fits, an appropriate tapered pin may be selected for use with that combination of half-sections 11 and 12.

Thus, in accordance with the present invention, for a range of tool joint o.d.s, it is possible to employ one half-section (either section 11 of 12) which is the same in the sense that it will have the same radius of curvature. However, within this range, once a given approximate tool joint o.d. is specified for a production string requiring a protector, the remaining half-section 11 or 12 will be selected having a radius of curvature such that in combination with the first section, the resulting diameter of the combined sections 11 and 12 will approximate the specified tool joint o.d. Then, to provide for a closer fit, reliance is made upon the tapered pins to provide additional adjustment in the internal circumference of the protector 10 to effect the desired interference fit.

The following table illustrates a typical application of the present invention. In this illustration, one half-section 11 having a constant radius of curvature will be combined with a relatively small number of second half-sections 12 having a relatively large and differing radiuses of curvature. This will results in each instance in a protector having an i.d. which at least generally approximates a desired i.d. to effect a good fit about the specified tool joint o.d.

For each such combination of half-sections then, tapered pins of differing dimensions are provided to achieve the desired more precise i.d. to effect the reliable interference fit between the protector 10 and the production string. It will be appreciated, however, that by limiting the number of such half-sections of varying radii, the aforementioned problem of maintaining a large inventory of such half-sections is avoided while, at the same time, providing the ability to effect a better fit of the protector 10 than was conventionally provided.

Figure 12:
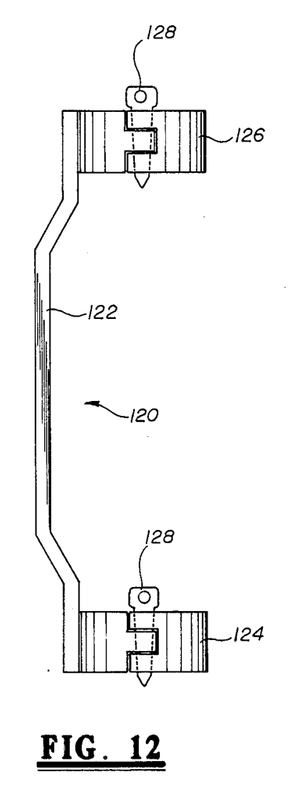
FIG. 12 is a side view of another embodiment of the present invention.

Referring now to FIG. 12, there will be seen depicted therein an alternate embodiment of a tubing protector 120 of the present invention. Protector 120 in the embodiment of FIG. 12 will be comprised of a main body 122 having disposed at opposed ends thereof collars 126 and 124. These collars 124 and 126 will be seen to be similar in appearance and function to those depicted in the embodiment of FIG. 7.

More particularly, each collar 124 and 126 will preferably be of a two-piece hinged construction and will include the tapered pin slot-tapered pin combination of the previously described embodiments.

Figure 13:
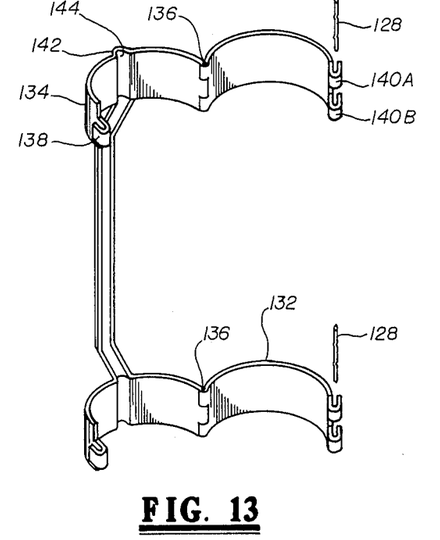
FIG. 13 is a pictorial view of the embodiment of the present invention depicted in FIG. 12.

Thus, with reference to FIG. 13, a pictorial view of the embodiment of FIG. 12 will be seen depicted therein, the collars and body thereof being adapted particularly for bare tubing. Still referring to FIG. 3, it will be noted that the collars 124 and 126 are preferably fabricated in a first and second section 132 and 134, respectively, and has hinges at one end of each half section held together by hinge pin 136 in like manner to the embodiment of FIG. 7. Again, similarly to the embodiment of FIG. 7, the half section 134 will have on the opposed edge thereof a plurality of pin guide sections 138. In like manner, the right half section 132 will have disposed on its edge thereof pin guide sections 140A and 140B. When the half sections are brought about the tubing and into mating engagement, also as with the embodiment of FIG. 7, a pin slot will thus be formed into which a tapered pin 128 may be inserted. As previously described with the other embodiments, as the tapered pin 128 is inserted further into the pin slot formed by the pin guide sections 138 and 140A and 140B the collar 126 is brought into tighter mating engagement about the tubing. It will be noted that a recess 142 is provided for receiving the bare tubing 144 which extends along the length of the tubing radially inwards of the protector 120 as aforementioned. Accordingly, the tubing will also run along the inside of the main body 122 in an appropriate radially inward groove thereof similar to that of the main body of the embodiments previously depicted.

Figure 14:
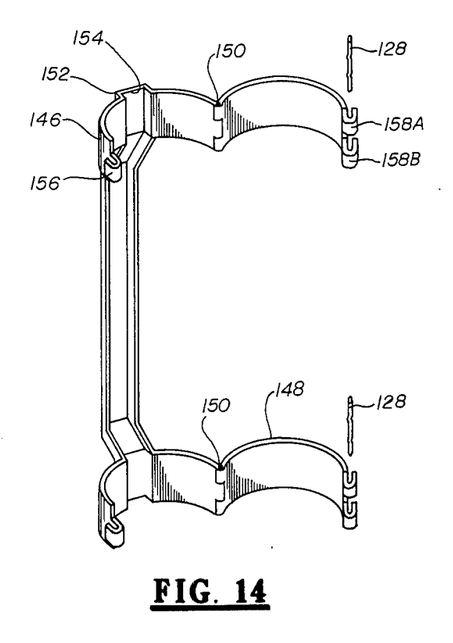
FIG. 14 is a pictorial view of an alternate embodiment of the protector depicted in FIG. 12.

With reference now to FIG. 14, an alternate embodiment of the collars 124 and 126 of the protector 120 of FIG. 12 will be seen depicted therein. In this embodiment, again half sections 146 and 148 are provided which are hinged at matingly received edges thereof to receive a hinge pin 150. On the other edges of the half sections 146 and 148, pin guide sections 156 and 158 are disposed similar to those depicted in the previous embodiments, again for the purpose of forming a pin guide slot for receiving a tapered pin 128. A comparison of FIGS. 13 and 14 reveals that the recess 152 of the embodiment of FIG. 14 is larger and wider than the recess 142 of FIG. 13. The purpose of this is to adapt the protector 120 for receiving an encapsulated tubing bundle rather than the bare tubing of FIG. 13. Again, this encapsulated bundle will run the length of the tubing string and be received radially inwards from the protector 120 fitting in the groove formed by the recess 152 which runs from the collars 124 and 126 along the inner portion of the main body 122.

In the alternate embodiment depicted in FIGS. 12–14, it will be appreciated that the feature of the present invention is employed wherein half sections of the collars are interchangeable and sized with respect to the tapering of the pins 128 and the expected OD of the tubings so as to effect the appropriate interface fit as previously described with respect to the other embodiments.

The present invention may be illustrated with the accompanying table which provides data for conventional production tubing and associated tool joints available in the industry. The data is intended for construction of a tubing protector in accordance with the present invention for tubing having a nominal 3.5 inch o.d. (i.e., dimension 71 of FIG. 2). However, it will be readily apparent from the illustration that the teachings of the present invention relating to this example may be readily adapted to tubing of other o.d.s such as those within the range of ¾ inch to 4½ inches which are conventional in the industry.

Referring to the table in more detail, column 1 indicates three dimensional ranges encompassing most tool joint diameters (dimension 72 of FIG. 2 for example), 11.9223–12.1202, or in other words, a circumferential difference in tool joint of 0.1979.

Referring back to column 4, the second pin having a center width of 0.6 will accommodate (with reference to column 6) a tool joint having a diameter within the range of 3.858–3.9217. The remaining two pins will accommodate tool joints within increasingly larger diameter ranges as indicated.

Referring back to column 1, note that for tool joint diameters within the second range of 4.049–4.3038, the same four pins may be utilized to cover this range in four stages. The only difference from the dimensions covering the range of 3.795–4.049 is, as aforementioned, that the two half-sections of the protector will have slightly larger radius of curvature.

| BASE TOOL JOINT RANGE DIA. | | CIRCUMFERENCE | PIN WIDTH | | | TOOL JOINT PROTECTOR DIAMETER | DIA. DIFF. | TOOL JOINT PROTECTOR CIRCUMFERENCE | CIRC. DIFF. |
|---|---|---|---|---|---|---|---|---|---|
| | | | TOP | CENTER | BOTTOM | | | | |
| MIN. | 3.795 | 11.9223 | .856 | .700 | .544 | 3.795–3.858 | .0637 | 11.9223–12.1202 | .1979 |
| | | | .756 | .600 | .444 | 3.858–3.9217 | .0637 | 12.1202–12.3204 | .2002 |
| | | | .656 | .500 | .344 | 3.9217–3.9854 | .0637 | 12.3204–12.5205 | .2001 |
| MAX. | 4.049 | 12.7203 | .556 | .400 | .244 | 3.9854–4.0490 | .0637 | 12.5205–12.7203 | .1998 |
| MIN. | 4.049 | 12.7203 | .856 | .700 | .544 | 4.0490–4.1127 | .0637 | 12.7203–12.9204 | .2001 |
| | | | .756 | .600 | .444 | 4.1127–4.1764 | .0637 | 12.9204–13.1205 | .2001 |
| | | | .656 | .500 | .344 | 4.1764–4.2401 | .0637 | 13.1205–13.3206 | .2001 |
| MAX. | 4.3038 | 13.5207 | .556 | .400 | .244 | 4.2401–4.3038 | .0637 | 13.3206–13.5207 | .2001 |
| MIN. | 4.3038 | 13.5207 | .856 | .700 | .544 | 4.3038–4.3675 | .0637 | 13.5207–13.7209 | .2002 |
| | | | .756 | .600 | .444 | 4.3675–4.4312 | .0637 | 13.7209–13.9210 | .2001 |
| | | | .656 | .500 | .344 | 4.4312–4.4949 | .0637 | 13.9210–14.1211 | .2001 |
| MAX. | 4.5586 | 14.3212 | .556 | .400 | .244 | 4.4949–4.5586 | .0637 | 14.1211–14.3212 | .2001 | these diameters being commercially available from different manufacturers and further being commonly encountered in the industry for 3½ inch o.d. tubing. Thus the indicated ranges are 3.795–4.049 inches, 4.049–4.3–0 inches, and 4.3038–4.5586 inches.

Each range will be accommodated by substantially the same two half-sections (11 and 12 of FIG. 1, for example) and four tapered pins each having different dimensions. The half-sections for a given range will differ dimensionally from those intended for a different range, but the pins will preferably be identical. Still referring to the table, column 2 indicates the range of circumferences of the tool joint to be accommodated which correspond to the tool joint diameters of column 1.

Columns 3, 4, and 5 indicate the tapering dimensions for four tapered pins which will accommodate the three ranges of tool joint diameters. Thus, for the entire range of tool joint diameters from 3.795 to 4.5586, four tapered pins will be provided. Taking, for example, the first pin in the four pin set for one of the three ranges, referring to column 4, the pin will desirably have a width of approximately 0.856 inches at its topmost end (see column 3). It will taper inwards to a nominal 0.7 inches (dimension X of FIG. 11). In like manner, it will taper gradually downwards to a dimension at its lowermost end of 0.544 inches (dimension Y of FIG. 11). Each pin will preferably be tapered by approximately 1.5° on a side, e.g., the angle indicated by reference number 61a will be 1.5°.

Referring now to column 6, for the pin just described, due to its tapered nature, it will readily accommodate tool joints having diameters within the range of 3.795 to 3.858, thus accommodating a tool joint diameter difference of 0.0637 as shown in column 7. With reference to columns 8 and 9, this corresponds to accommodating a tool joint protector circumference range of between With respect to use of the term radius of curvature for half-sections, with reference to FIG. 4, this term will generally be intended to mean the distance from the center of the tool joint to points indicated by reference numbers 65, 66, 67, and 68, thus defining a cross-sectional area indicating by the cross-hatching in FIG. 4. As previously noted, it is desirable to provide half-sections which have substantially the same radius of curvature so as to decrease the number of dies required for manufacture thereof. However, it will be apparent that it may further be desirable in some applications for the half-sections to differ in terms of their radius of curvature.

Still referring to the half-sections, it will further be appreciated that in order to effect the desired interference fit, it would be preferable to have the radius of curvature of the half-sections slightly smaller than the expected o.d. of the tool joint so as to provide a tight fit thereabout. Moreover, it will be appreciated that the amount of undersizing will, in turn, be a function of such things as the tensile strength of the metal from which the half-sections are fashioned, inasmuch as reliefs 68 of FIG. 4, for example, will provide some give to insure the tight fit about the joint. It will further be appreciated that the radius of curvature will vary dependent upon such things as the thickness of the encapsulated bundle 66, and thus dimensions for radius of curvature for given half-sections have been omitted from Table 1. With a given nominal o.d. expected to be accommodated by a protector, it will be apparent that the radius of curvature may be selected so that tapered pins may be provided whereby a tight interference fit will be effected at the aforementioned contact points 65–68.

With reference to the embodiment depicted in FIGS. 12–14, it will be noted that the two collars are intended to contact the outer surface of the tubing itself rather than the tool joint. Inasmuch as for a given specified tubing o.d., the variation thereof will not be as great as that of the joint, it is to be understood that conventional expected dimensional variations may be accommodated by fewer tapered pins with a shorter taper, e.g., for a given radius of curvature of the collars, two tapered pins with a taper of 1° nominally may be found satisfactory.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. For use in protecting couplings of a production string and tubing adapted to transmit fluid media from the surface to a subsurface location, a latch-type protector having a longitudinal axis therethrough and comprising:
   a first half-section member having
      a half-cylindrical shape and including
      a first edge parallel to said axis defining a plurality of first hinge sections;
      a second edge parallel to said axis defining a plurality of first pin guide sections and a first window portion between said first pin guide sections;
      a plurality of indents extending radially inward toward and parallel to said axis;
      a first pair of lugs disposed at one end of said first member and extending radially inward;
      a second pair of lugs disposed at the other end of said first member and extending radially inward;
   a second half-section member having
      a half-cylindrical shape and including
      a first edge parallel to said axis defining a plurality of second hinge sections;
      a second edge parallel to said axis defining a plurality of second pin guide sections and a second window portion between said second pin guide sections;
      a first pair of lugs disposed at one end of said second member and extending radially inward;
      a second pair of lugs disposed at the other end of said second member and extending radially inward;
   a recess extending in the direction of said axis for receiving said tubing;
   said pluralities of first and second hinge sections being in matingly engageable alignment to define a hinge pin slot parallel to said axis;
   a hinge pin disposable within said hinge pin slot, said first and second members thereby being in hinged relation and defining a cylindrical shape when disposed about said coupling;
   said pluralities of first and second pin guide sections being in matingly engageable alignment to define first and second pin slots parallel to said axis on either side of said first and second window portions;
   first and second tapered pin means disposable in respective ones of said first and second pin slots for compensating for variance in outside diameter of said couplings; and
   said first and second hipge sections, said first and second pin guide sections, and said indents, having radially inwardmost portions extending in the direction of said axis and in an interference fit with the outer surface of said coupling when said tapered pins and said hinge pin are disposed, respectively, in said first and second pin slots and said hinge pin slot.

2. The apparatus of claim 1, wherein said radially inwardmost portion of said first and second hinge sections, said first and second pin guide sections, and said indents define a circular cross-sectional area lying in a plane perpendicular to said axis when in said interference fit; and wherein
   said area decreases with movement of said first and second tapered pins into said respective ones of said first and second pin slots.

3. The apparatus of claim 2, wherein said taper of said pins is preselected to be in an amount sufficient to cause said decrease in said cross-sectional area in an amount sufficient to prevent substantial relative motion between said protector and said coupling.

4. The apparatus of claim 2, wherein said recess extends radially outwards in an amount whereby said tubing, when disposed between said protector and said coupling in said recess has a radially inwardmost portion extending in said direction of said axis in said interference fit.

5. The apparatus of claim 4, wherein
   said first and said second members define a respective first and second radius of curvature; and
   wherein at least one of said first and second radii and said taper of said pins are preselected in functional relation to effect a preselected magnitude of said decrease in said cross-sectional area with said movement of said first and second tapered pins to prevent substantial relative longitudinal movement between said protector, said production string, and said tubing.

6. The apparatus of claim 6, wherein
   at least one of said first and second members is preselected from a plurality thereof each having a different radius of curvature; and
   wherein said first and second tapered pins are preselected from a plurality thereof each having a different taper.

7. For use in protecting couplings of a production string and tubing adapted to transmit fluid media from the surface to a subsurface location, a latch-type protector having a longitudinal axis therethrough and comprising:
   a first half-section member having
      a half-cylindrical shape and including
      a first edge parallel to said axis defining a plurality of first hinge sections;
      a second edge parallel to said axis defining a plurality of first pin guide sections and a first window portion between said first pin guide sections;
      a first recess extending in the direction of said axis for receiving said tubing;
      a first pair of lugs disposed at one end of said first member and extending radially inward;
      a second pair of lugs disposed at the other end of said first member and extending radially inward;

a second half-section member having
a half-cylindrical shape and including
a first edge parallel to said axis defining a plurality of second hinge sections;
a second edge parallel to said axis defining a plurality of second pin sections and a second window portion between said second pin guide sections;
a first pair of lugs disposed at one end of said second member and extending radially inward;
a second pair of lugs disposed at the other end of said second member and extending radially inward;
a second recess extending in the direction of said axis for receiving said tubing;
said pluralities of first and second hinge sections being in matingly engageable alignment to define a hinge pin slot parallel to said axis;
a hinge pin disposable within said hinge pin slot, said first and second members thereby being in hinged relation and defining a cylindrical shape when disposed about said coupling;
said pluralities of first and second pin guide sections being in matingly engageable alignment to define first and second pin slots parallel to said axis on either side of said first and second window portions;
first and second tapered pin means for effecting an interference fit of said protector in an amount sufficient to prevent substantial longitudinal movement of said protector relative to said production string and said tubing disposable in respective ones of said first and second pin slots; and
said first and second hinge sections, said first and second pin guide sections, and said tubing, when disposed between said protector and said coupling in said recesses, having radially inwardmost portions extending in the direction of said axis and in said interference fit with the outer surface of said coupling when said tapered pins and said hinge pin are disposed, respectively, in said first and second pin slots and said hinge pin slot.

8. The apparatus of claim 7, wherein
said radially inwardmost portion of said first and second hinge sections, said first and second pin guide sections, and said tubing define a circular cross-sectional area lying in a plane perpendicular to said axis when in said interference fit; and wherein
said area decreases with movement of said first and second tapered pins into said respective ones of said first and second pin slots.

9. For use in protecting a coupling of a production string and tubing adapted to transmit fluid media from the surface to a subsurface location, a latch-type protector having a longitudinal axis therethrough and comprising:
a first half-section member having
a half-cylindrical shape and including
a first edge parallel to said axis defining a plurality of first hinge sections;
a second edge parallel to said axis defining a plurality of first pin guide sections and a first window portion between said first pin guide sections;
first indents extending radially inward toward and parallel to said axis;
a first pair of lugs disposed at one end of said first member and extending radially inward;
a second pair of lugs disposed at the other end of said first member and extending radially inward;
a second half-section member having
a half-cylindrical shape and including
a first edge parallel to said axis defining a plurality of second hinge sections;
a second edge parallel to said axis defining a plurality of second pin guide sections and a first window portion between said second pin guide sections;
a first pair of lugs disposed at one end of said second member and extending radially inward;
a second pair of lugs disposed at the other end of said second member and extending radially inward;
a second plurality of indents radially inward toward and parallel to said axis for receiving said tubing;
said pluralities of first and second hinge sections being in matingly engageable alignment to define a hinge pin slot parallel to said axis;
a hinge pin disposable within said hinge pin slot, said first and second members thereby being in hinged relation and defining a cylindrical shape when disposed about said coupling;
said pluralities of first and second pin guide sections being in matingly engageable alignment to define first and second pin slots parallel to said axis on either side of said first and second window portions;
first and second tapered pins disposable in respective ones of said first and second pin slots; and
said first and second hinge sections, said first and second pin guide sections, and said first and second pluralities of indents having radially inwardmost portions extending in the direction of said axis and in an interference fit with the outer surface of said coupling when said tapered pins and said hinge pin are disposed, respectively, in said first and second pin slots and said hinge pin slot.

10. The apparatus of claim 9, wherein
said radially inwardmost portions of said first and second hinge sections, said first and second pin guide sections, and said first and second pluralities of indents define a circular cross-sectional area lying in a plane perpendicular to said axis when in said interference fit; and wherein
said area decreases with movement of said first and second tapered pins into said respective ones of said first and second pin slots.

11. The apparatus of claim 10, wherein said first and second pluralities of indents each define respective first and second spaces for receiving said tubing.

* * * * *